(12) United States Patent
Hayman et al.

(10) Patent No.: US 9,297,318 B2
(45) Date of Patent: Mar. 29, 2016

(54) CRANKSHAFT FOR VARIABLE DISPLACEMENT INTERNAL COMBUSTION ENGINE

(71) Applicant: GM GLOBAL TECHNOLOGY OPERATIONS LLC, Detroit, MI (US)

(72) Inventors: Alan W. Hayman, Romeo, MI (US); Robert S. McAlpine, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 323 days.

(21) Appl. No.: 13/848,105

(22) Filed: Mar. 21, 2013

(65) Prior Publication Data

US 2014/0283783 A1 Sep. 25, 2014

(51) Int. Cl.
| *F02D 17/02* | (2006.01) |
| *F02D 13/06* | (2006.01) |
| *F16C 3/06* | (2006.01) |
| *F01L 1/14* | (2006.01) |
| *F01L 13/00* | (2006.01) |
| *F01L 1/053* | (2006.01) |

(52) U.S. Cl.
CPC .............. *F02D 17/02* (2013.01); *F02D 13/06* (2013.01); *F16C 3/06* (2013.01); *F01L 1/143* (2013.01); *F01L 13/0005* (2013.01); *F01L 2001/0537* (2013.01); *F01L 2013/001* (2013.01); *Y02T 10/18* (2013.01); *Y10T 29/49286* (2015.01)

(58) Field of Classification Search
CPC ........... F16C 3/06; F02D 17/02; F02D 13/06; F02D 41/0087; F01L 1/143; F01L 2001/0537; F01L 2013/001; F01L 13/0005; Y10T 29/49286; Y10T 10/18
See application file for complete search history.

(56) References Cited

U.S. PATENT DOCUMENTS

| 1,923,018 | A | * | 8/1933 | Barkeij | F02B 75/20 |
| | | | | | 123/184.39 |
| 5,189,993 | A | * | 3/1993 | Schneider | F02B 75/32 |
| | | | | | 123/192.2 |
| 7,654,242 | B2 | * | 2/2010 | Kinoshita | 123/198 F |
| 2002/0088424 | A1 | * | 7/2002 | Sayama et al. | 123/192.2 |
| 2002/0096139 | A1 | * | 7/2002 | Zheng | F01L 1/146 |
| | | | | | 123/198 F |
| 2004/0099242 | A1 | * | 5/2004 | Wu et al. | 123/198 F |
| 2008/0072869 | A1 | * | 3/2008 | Maehara et al. | 123/198 F |
| 2009/0277414 | A1 | * | 11/2009 | Lee et al. | 123/192.2 |
| 2010/0224164 | A1 | * | 9/2010 | Rabhi | F01M 1/06 |
| | | | | | 123/197.4 |
| 2011/0017167 | A1 | * | 1/2011 | Karabatsos | F02B 75/32 |
| | | | | | 123/197.4 |
| 2012/0055444 | A1 | * | 3/2012 | Tobergte et al. | 123/294 |

FOREIGN PATENT DOCUMENTS

| CN | 101608578 A | 12/2009 | |
| DE | 102009055757 A1 * | 5/2011 | .............. F02B 75/20 |
| JP | 2009138619 A | 6/2009 | |

* cited by examiner

*Primary Examiner* — Hung Q Nguyen
*Assistant Examiner* — Brian P Monahon
(74) *Attorney, Agent, or Firm* — Quinn Law Group, PLLC (57) ABSTRACT

A crankshaft includes a plurality of crankpins. The crankpins are defined on the crankshaft and are longitudinally spaced apart from each other along a rotational axis. Each of the crankpins is configured to be operatively connected to a piston of an engine including a plurality of cylinders. The engine is configured to deactivate one of the cylinders. At least two of the crankpins are substantially aligned with each other along a pin axis. At least one of the crankpins is rotationally offset from the pin axis in a rotational direction of the crankshaft such that the engine has an even firing order even when one of the cylinders is deactivated.

6 Claims, 4 Drawing Sheets

FIG. 7

CRANKSHAFT FOR VARIABLE DISPLACEMENT INTERNAL COMBUSTION ENGINE

TECHNICAL FIELD

The present disclosure relates to crankshafts for variable displacement internal combustion engines.

BACKGROUND

Variable displacement internal combustion engines (VDIC engines) allow the engine displacement to change, typically by deactivating cylinders, to improve fuel economy. Specifically, at least some of the cylinders may be deactivated to regulate torque output of the engine. To do so, the intake valves of cylinders to be deactivated may be closed and a supply of fuel to the cylinders to be deactivated may be disabled. The number of activated cylinders may be based on the driver torque request.

SUMMARY

The present disclosure relates to crankshafts for variable displacement internal combustion engines. In an embodiment, the crankshaft includes a plurality of crankpins. The crankpins are interconnected to one another and are longitudinally spaced apart from each other along a rotational axis. Each of the crankpins is configured to be operatively connected to a respective piston of an engine including a plurality of cylinders. The engine is configured to deactivate one of the cylinders. At least two of the crankpins are substantially aligned with each other along a pin axis. At least one of the crankpins is rotationally offset from the pin axis in a rotational direction of the crankshaft such that the engine has an even firing order even when one of the cylinders is deactivated.

The plurality of crankpins may include a first crankpin, a second crankpin, a third crankpin, and a fourth crankpin. The first and fourth crankpins are substantially aligned with each other along the pin axis. The first and fourth crankpins may not be rotationally offset from each other. The second crankpin may be rotationally offset from the pin axis by about 240 degrees in the rotational direction. The fourth crankpin may be rotationally offset from the pin axis by about 120 degrees in the rotational direction.

In an embodiment, the plurality of crankpins includes a first crankpin, a second crankpin, a third crankpin, and a fourth crankpin, and the second and third crankpins are substantially aligned with each other along the pin axis. The first and fourth crankpins may not be rotationally offset from each other. The first crankpin may be rotationally offset from the pin axis by about 240 degrees in the rotational direction. The fourth crankpin may be rotationally offset from the pin axis by about 120 degrees. The pin axis may be substantially parallel to the rotational axis.

In an embodiment, the plurality of crankpins includes a first crankpin, a second crankpin, and a third crankpin. The first and second crankpins are substantially aligned with each other along the pin axis. The third crankpin may be rotationally offset from the pin axis by about 180 degrees in the rotational direction.

In an embodiment, the plurality of crankpins includes a first crankpin, a second crankpin, and a third crankpin, and the second and third crankpins are substantially aligned with each other along the pin axis. The first crankpin may be rotationally offset from the pin axis by about 180 degrees in the rotational direction.

The present disclosure also relates to engine assemblies. In an embodiment, the engine assembly generally includes an engine block, a plurality of pistons and a crankshaft. The engine block defines a first cylinder, a second cylinder, a third cylinder, and a fourth cylinder arranged along a cylinder bank in an inline cylinder arrangement. Each piston is disposed in one of the first, second, third, and fourth cylinders. The crankshaft is operatively coupled to the plurality of pistons such that the crankshaft is configured to rotate about a rotational axis in a rotational direction as the pistons reciprocate within the first, second, third, and fourth cylinders. The crankshaft includes a first crankpin, a second crankpin, a third crankpin, and a fourth crankpin longitudinally spaced apart from one another along the rotational axis. The first crankpin and the fourth crankpin are substantially aligned with each other along a pin axis, and the second and third crankpins are both rotationally offset from the first and fourth crankpins in the rotational direction.

In an embodiment, the engine assembly may further include an intake valve operatively coupled with the fourth cylinder. The intake valve is movable between an open position to allow air/fuel mixture to enter the fourth cylinder and a closed position to preclude the air/fuel mixture from entering the fourth cylinder. The engine assembly further includes a control module configured to maintain the intake valve in a closed position so as to deactivate the fourth cylinder until the engine assembly is operated at a predetermined torque threshold.

In an embodiment, the second crankpin is rotationally offset from the first and fourth crankpin by about 240 degrees in the rotational direction. The third crankpin may be rotationally offset form the first and fourth crankpins by about 120 degrees in the rotational direction.

The present disclosure also relates to methods of manufacturing a crankshaft. In an embodiment, the method includes forging a metallic structure to form a crankshaft having first, second, third, and fourth interconnected crankpins axially spaced apart from one another along a rotational axis. The first and fourth crankpins of the crankshaft made using the disclosed method are substantially aligned with each other along a pin axis. In addition, the second and third crankpins are rotationally offset from each other and from the pin axis in a rotational direction. The second crankpin of the crankshaft formed using the disclosed method may be rotationally offset from the first crankpin and fourth crankpin by about 240 degrees in the rotational direction.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
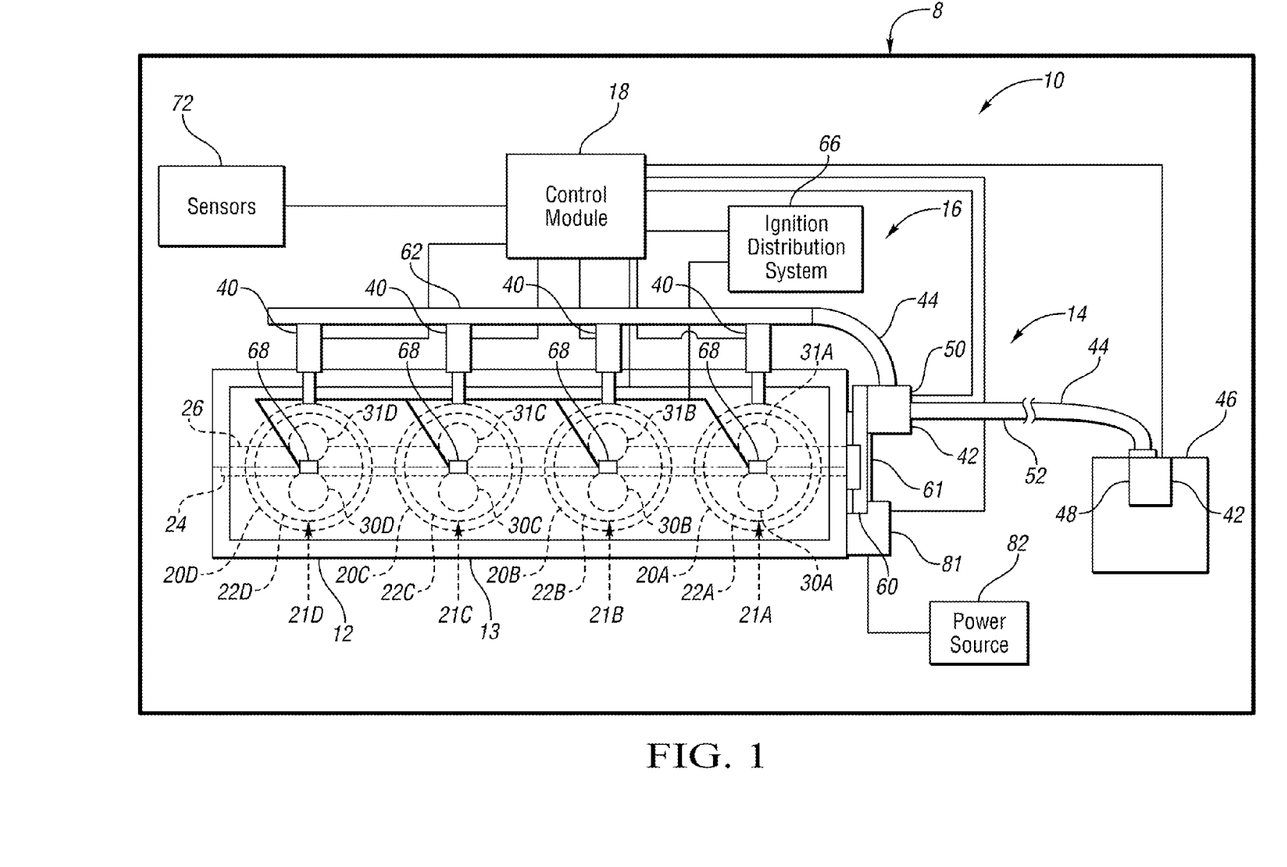
FIG. 1 is a schematic illustration of a vehicle including an engine assembly according to an embodiment of the present disclosure.
Figure 2:
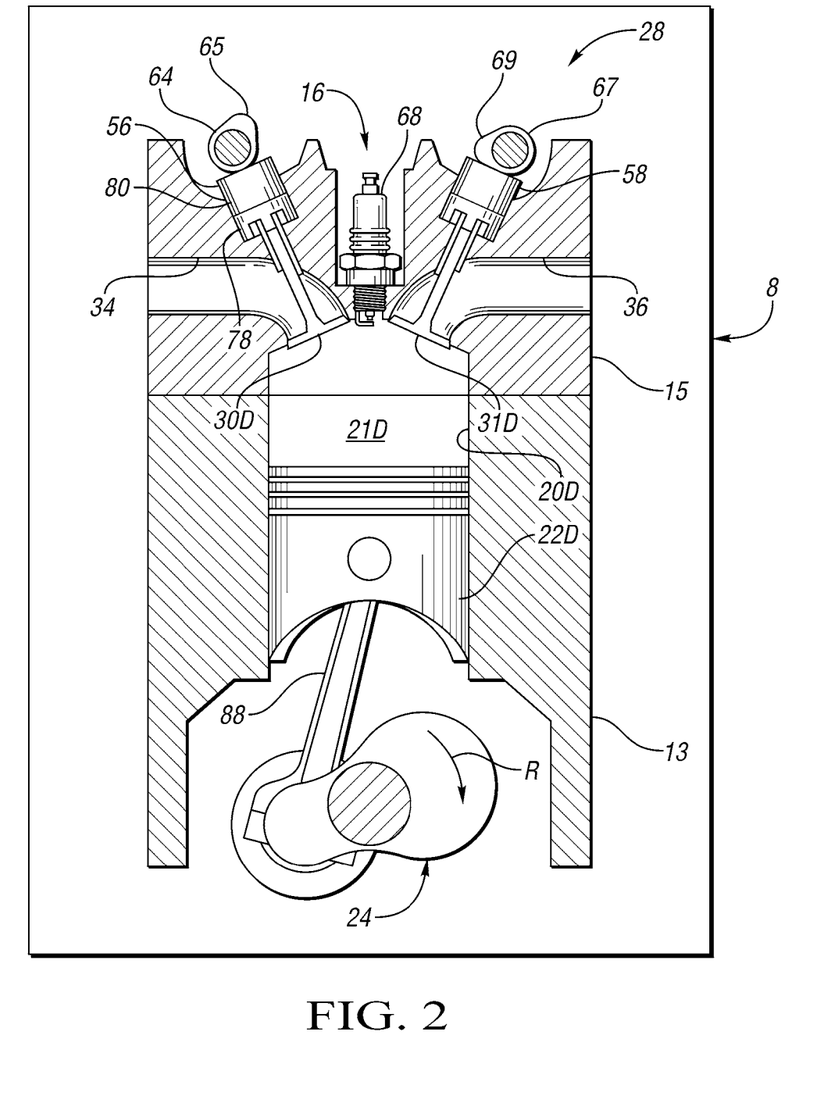
FIG. 2 is a schematic side section view of the engine assembly of FIG. 1.

Referring to the drawings, wherein like reference numbers refer to like components, FIGS. 1 and 2 schematically show a vehicle 8 including an engine assembly 10 configured to power the vehicle 8. The engine assembly 10 may be a gasoline direct injection engine assembly, a homogeneous charge compression ignition engine assembly, diesel engine systems, a forced induction engine assembly, a naturally aspirated engine assembly or any other suitable engine assembly. In the depicted embodiment, the engine assembly 10 generally includes a variable displacement internal combustion engine 12, a common rail fuel injection system 14, an ignition system 16, a valve train assembly 28, a control module 18, and a crankshaft 24. In operation, the engine 12 combusts an air and fuel mixture to produce drive torque.

The engine 12 includes an engine block 13 and a cylinder head 15. The engine block 13 defines a first cylinder 20A, a second cylinder 20B, a third cylinder 20C, and a fourth cylinder 20D. Although FIG. 1 depicts four cylinders, it is contemplated that the engine 12 may include more or fewer cylinders. The first cylinder 20A, second cylinder 20B, third cylinder 20C, and fourth cylinder 20D may be arranged along one cylinder bank in an inline cylinder arrangement. The first cylinder 20A defines a first combustion chamber 21A. The second cylinder 20B defines a second combustion chamber 21B. The third cylinder 20C defines a third combustion chamber 21C. The fourth cylinder 20D defines a fourth combustion chamber 21D. The engine 12 further includes a first piston 22A disposed in the first cylinder 20A, a second piston 22B disposed in the second cylinder 20B, a third piston 22C disposed in the third cylinder 20C, and a fourth piston 22D disposed in the fourth cylinder 20D.

During operation of the engine 12, air may be drawn into an intake manifold through a throttle. Air is drawn into the cylinders 20A, 20B, 20C, and 20D from the intake manifold (not shown) and is compressed therein. Fuel is injected into cylinders 20A, 20B, 20C, and 20D by the fuel injection system 14, and the air/fuel mixture is ignited. Exhaust gases are exhausted from the cylinders 20A, 20B, 20C, 20D into an exhaust system (not shown).

The fuel injection system 14 includes fuel injectors 40 that are mounted on the engine 12 and that directly inject fuel into combustion chambers 21A, 21B, 21C, 21D. The fuel injectors 40 receive fuel from one or more fuel pumps 42, one or more fuel rails or lines 44, and a fuel tank 46. In the depicted embodiment, a low-pressure fuel pump 48 is disposed within the fuel tank 46 and provides fuel to a high-pressure pump 50 via a low-pressure fuel line 52. The high-pressure pump 50 is mounted on or proximate to the engine 12 and operates based on speed of the engine 12. The high-pressure pump 50 may receive rotational energy from the crankshaft 24 via a belt 60 and a pair of pulleys 61 or the like. The pulleys 61 provide a predetermined ratio between the operating speed of the engine 12 and the operating speed of the high-pressure pump 50. The high-pressure pump 50 may operate based on speed of a camshaft or via some other control mechanism. A high-pressure fuel rail 62 channels fuel between the high-pressure pump 50 and the fuel injectors 40. The fuel injectors 40 provide fuel to the combustion chambers 21 based on signals received from the control module 18.

The ignition system 16 includes a plurality of spark plugs 68 each configured to provide a spark to ignite air/fuel mixtures in each of the combustion chambers 21A, 21B, 21C, 21D. The ignition system 16 may include an ignition distribution system 66 that provides current to one or more spark plugs 68 or other ignition devices. The ignition distribution system 66 may include coils, distributors, wires, and other mechanical and/or electronic ignition components and devices.

The cylinder head 15 defines intake ports 34 and exhaust ports 36 in fluid communication with the cylinders 20A, 20B, 20C, 20D. Each intake port 34 is configured to direct an air/fuel mixture to the respective combustion chamber 21A, 21B, 21C, or 21D from the intake manifold (not shown). Conversely, each exhaust port 36 is configured to allow exhaust gas to be released from the respective combustion chambers 21A, 21B, 21C, or 21D. Following combustion of the air/fuel mixture (such as when ignited by a spark from the spark plug 68), the exhaust port 36 may carry exhaust gases out of the respective combustion chamber 21A, 21B, 21C, or 21D.

The valve train assembly 28 is configured to control fluid flow into and out the combustion chambers 21A, 21B, 21C, or 21D and generally includes a first exhaust valve 31A, a second exhaust valve 31B, a third exhaust valve 31C, a fourth exhaust valve 31D, a first intake valve 30A, a second intake valve 30B, a third intake valve 30C, and a fourth intake valve 30D, a plurality of intake valve lift mechanism 56, a plurality of exhaust valve lift mechanisms 58, a plurality of intake valve camshafts 64, and a plurality of exhaust valve camshafts 67. Although illustrated as an overhead cam arrangement, it is envisioned that the valve train assembly 28 may have other suitable arrangements such as a cam-in-block arrangement.

The first intake valve 30A, second intake valve 30B, third intake valve 30C, and fourth intake valve 30D are each configured to control the flow of air/fuel mixture into the first cylinder 20A, the second cylinder 20B, the third cylinder 20C, and the fourth cylinder 20D, respectively. Each of the first intake valve 30A, second intake valve 30B, third intake valve 30C, and fourth intake valve 30D is at least partly disposed in the intake port 34 that is fluidly coupled to the respective cylinder 20A, 20B, 20C, 20D and is configured to move between an open position and a closed position. In the open position, each of the first intake valve 30A, second intake valve 30B, third intake valve 30C, and fourth intake valve 30D allows the air/fuel mixture to flow into the respective combustion chamber 21A, 21B, 21C, or 21D. Conversely, in the closed position, the first intake valve 30A, second intake valve 30B, third intake valve 30C, and fourth intake valve 30D precludes the air/fuel mixture from flowing into the first combustion chamber 21A, second combustion chamber 21B, third combustion chamber 21C, and fourth combustion chamber 21D, respectively.

The first exhaust valve 31A, second exhaust valve 31B, third exhaust valve 31C, and fourth exhaust valve 31D are each configured to control the flow of exhausts gases released from the respective combustion chambers 21A, 21B, 21C, or 21D. Each of the first exhaust valve 31A, second exhaust valve 31B, third exhaust valve 31C, and fourth exhaust valve 31D is at least partly disposed in the exhaust port 36 that is fluidly coupled to the respective cylinder 20A, 20B, 20C, 20D and is configured to move between an open position and a closed position. In the open position, each of the first exhaust valve 31A, second exhaust valve 31B, third exhaust valve 31C, and fourth exhaust valve 31D allows exhaust gases to be released from the respective combustion chamber 21A, 21B, 21C, or 21D. In the closed position, the first exhaust valve 31A, second exhaust valve 31B, third exhaust valve 31C, and fourth exhaust valve 31D precludes exhausts gases from being released from the first combustion chamber 21A, second combustion chamber 21B, third combustion chamber 21C, and fourth combustion chamber 21D, respectively The valve train assembly 28 may include four intake valve lift mechanisms 56 each operatively coupled to one of the first intake valve 30A, second intake valve 30B, third intake valve 30C, and fourth intake valve 30D. It is contemplated, however, that the valve train assembly 28 may include more or fewer intake valve lift mechanisms 56. The number of intake valve lift mechanisms 56 may correlate to the number of cylinders. For example, if the engine 12 has three cylinders, the valve train assembly 28 may include three intake valve lift mechanisms 56. Irrespective of the number, each intake valve lift mechanism 56 is configured to move the respective intake valve 30A, 30B, 30C, 30D between the open position and closed position. To do so, each intake valve lift mechanism 56 is operatively coupled to one of the intake valve camshaft 64. Each intake valve camshaft 64 is configured to rotate and includes an intake valve cam lobe 65 configured to apply a force to the corresponding intake valve lift mechanism 56. As the intake valve camshaft 64 rotates, the intake valve cam lobe 65 eventually applies a force to the intake valve lift mechanism 56 to displace one of the intake valves 30A, 30B, 30C, 30D between the open position and closed position.

One or more intake valve lift mechanisms 56 are configured to operate in a first or active mode and a second or inactive mode. In the depicted embodiment, only the intake valve lift mechanism 56 that is operatively coupled to the fourth intake valve 30D can operate in the active mode and the inactive mode. Thus, only the fourth cylinder 20D can be deactivated while the engine 12 is in operation. It is contemplated, however, that another intake valve lift mechanism 56 may operate in active and inactive modes and, therefore, another cylinder (other than the fourth cylinder 20D) may be deactivated.

In the active mode, the intake valve lift mechanism 56 displaces the intake valve 30D between the open and closed positions while the engine 12 is operating. Conversely, in the inactive mode, the intake valve lift mechanism 56 does not displace the intake valve 30D between the open and closed positions while the engine 12 is operating. Rather, the intake valve 30D remains in the closed position when the intake valve lift mechanism 56 is in the inactive mode, thereby precluding the air/fuel mixture from entering the fourth combustion chamber 21D. As a consequence, combustion does not occur in the fourth combustion chamber 21D during the engine operating cycle while combustion is occurring at other combustion chambers 21A, 21B, 21C during the same engine operating cycle. Hence, the fourth cylinder 21D is deactivated.

In the depicted embodiment, the intake valve lift mechanism 56 that is operatively associated with the fourth cylinder 21D includes a first lift member 78 operatively coupled to the fourth intake valve 30D and a second lift member 80 operatively coupled to the intake valve camshaft 64. When the intake valve lift mechanism 56 is in the active mode, the first lift member 78 and the second lift member 80 may be fixed with respect to each other so that the fourth intake valve 30D is displaced to the open position when the intake valve cam lobe 65 applies a force to the intake valve lift mechanism 56. When the intake valve lift mechanism 56 is in the inactive mode, the first lift member 78 and second lift member 80 may be displaced relative to each other such that the fourth intake valve 30D remains in the closed position even when the intake valve cam lobe 65 applies a force to the intake valve lift mechanism 56.

The valve train assembly 28 may include four exhaust valve lift mechanisms 58 each operatively coupled with one of the first exhaust valve 31A, second exhaust valve 31B, third exhaust valve 31C, and fourth exhaust valve 31D. However, it is envisioned that the valve train assembly 28 may include more or fewer exhaust lift mechanisms 58. The number of exhaust valve lift mechanism may correlate to the number of cylinders. For instance, if the engine 12 includes three cylinders, the valve train assembly 28 may include three exhaust valve lift mechanism 58. Regardless of the number, each exhaust valve lift mechanism 58 is operatively coupled to one of the exhaust valve camshafts 67. Each exhaust valve camshaft 67 is configured to rotate and includes an exhaust cam lobe 69 configured to apply a force to the corresponding exhaust valve lift mechanism 58. While the exhaust valve camshaft 67 rotates, the exhaust cam lobe 69 applies a force to the exhaust valve lift mechanism 56 to displace one of the exhaust valves 31A, 31B, 31C, 31D between the open position and closed position.

The control module 18 regulates the valve train assembly 28 and can operate in a partial cylinder deactivation mode based on sensor status signals received from one or more torque request sensors 72. In the partial cylinder deactivation mode, the control module 18 deactivates only one cylinder 20A, 20B, 20C or 20D. In the depicted embodiment, the control module 18 can deactivate only the fourth cylinder 20D by switching the intake valve lift mechanism 56 operatively coupled to the fourth intake valve 30D to the inactive mode. For example, the control module 18 may deactivate the fourth cylinder 20D when the engine 12 operates below a predetermined torque threshold and activate the fourth cylinder 20D when the engine 12 operates at or above the predetermined torque threshold. The predetermined torque threshold may be, for example, about 200 Newton meters.

In addition to the valve train assembly 28, the control module 18 may regulate other components or operating processes of the engine assembly 10 and may receive sensor status signals from various sensors such as fuel pressure sensors. For instance, based on status signals received from the other suitable sensors, the control module 18 may control air injection, fuel injection, cranking, ignition and other engine operating functions. Suitable sensors may include, for example, temperature sensors, pressure sensors, flow sensors, oxygen level sensors, engine speed sensors, and air-fuel sensors for status determination and control of the engine assembly 10. The temperature sensors may include an engine temperature sensor, a coolant temperature sensor, an oil temperature sensor, an ambient temperature sensor and/or other temperature sensors. The pressure sensors may include cylinder pressure sensors.

The control module 18 may be microprocessor based such as a computer having a central processing unit, memory (RAM and/or ROM), and associated input and output buses. The control module 18 may be an application-specific integrated circuit or may be formed of other logic devices known in the art. The control module 18 may each be a portion of a central vehicle main control unit, an interactive vehicle dynamics module, a main control module, a control circuit having a power supply, combined into a single integrated control module, or may be a stand-alone control module.

Regardless of its configuration, the control module 18 is configured to maintain the fourth intake valve 30D (or any other intake valve) in the closed position so as to deactivate the fourth cylinder 20D (or any other cylinder) until the engine assembly 10 operates at or above a predetermined torque threshold. As discussed above, the predetermined torque threshold may be 200 Newton meters.

The engine assembly 10 may further include a starter 81. The starter 81 is used to crank the crankshaft 24 directly and indirectly and begin the reciprocating motion of the pistons 22A, 22B, 22C, 22D to facilitate the internal combustion process. The starter 81 may receive power from a power source 82, such as a battery, or some other power source 82. The starter 81 may rotate a flywheel that is coupled to the crankshaft 24.

The crankshaft 24 may be rotationally supported by the engine block 13 and is operatively connected to the pistons 22A, 22B, 22C, 22D via a plurality of connecting rods 88. As such, during operation of the engine 12, the crankshaft 24 rotates in a rotational direction indicated by arrow R as the pistons 22A, 22B, 22C, 22D reciprocate within the cylinders 20A, 20B, 20C, 20D.

When the engine 12 runs at light loads, it is desirable to reduce fuel consumption as much as possible. To this end, one of the cylinders 20A, 20B, 20C, 20D, such as the fourth cylinder 20D, may be deactivated. However, simply deactivating one cylinder while still using a conventional crankshaft may result in an odd firing order, causing an increase in the noise, vibration, and harshness (NVH) of the engine 12. It is therefore desirable to develop a crankshaft configured for even firing intervals when all the cylinders are active or when one of the cylinders is deactivated.

Figure 3:
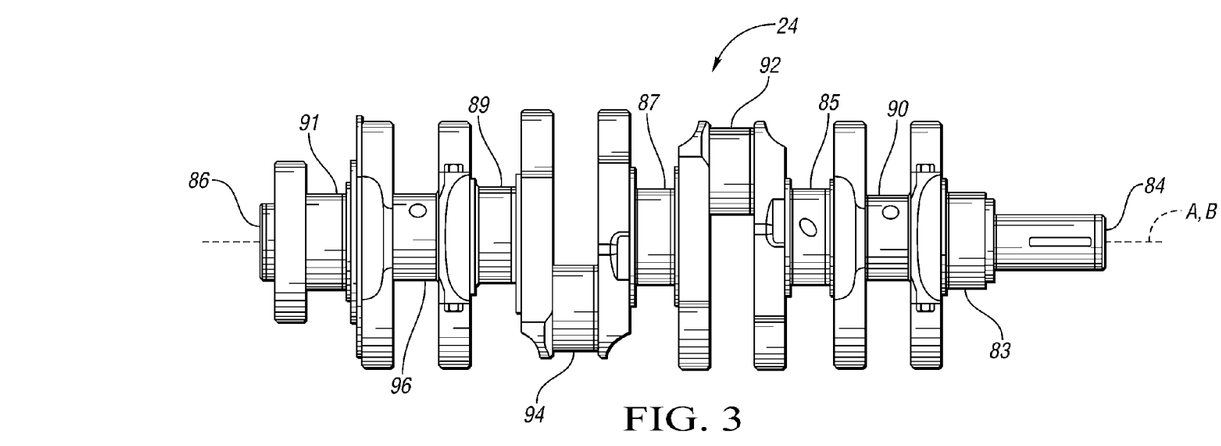
FIG. 3 is a side view of a crankshaft of the engine assembly of FIG. 1.

With reference to FIG. 3, the crankshaft 24 may define a first crankshaft end 84 and a second crankshaft end 86 longitudinally spaced apart from each other along a rotational axis A. The crankshaft 24 can rotate about the rotational axis A and includes a first crankpin 90, second crankpin 92, third crankpin 94, and fourth crankpin 96 each located radially outward from the rotational axis A. The first piston 22A (FIG. 1) may be coupled to the first crankpin 90 via one or more connecting rods 88 (FIG. 2). The second piston 22B (FIG. 1) may be coupled to the second crankpin 92 via one or more connecting rods 88 (FIG. 2). The third piston 22C (FIG. 1) may be coupled to the third crankpin 94 via one or more connecting rods 88 (FIG. 2). The fourth piston 22D (FIG. 1) may be coupled to the fourth crankpin 96 via one or more connecting rods 88 (FIG. 2). The first crankpin 90 may be located adjacent the first crankshaft end 84 of crankshaft 24, whereas the fourth crankpin 96 may be located adjacent the second crankshaft end 86. The second crankpin 92 may be located axially between the first crankpin 90 and the third crankpin 94. The third crankpin 94 may be located axially between the second crankpin 92 and the fourth crankpin 96. The fourth crankpin 96 may be substantially aligned with the first crankpin 90 along a pin axis B. The pin axis B may be substantially parallel to the rotational axis A.

The crankshaft 24 includes a first bearing journal 83, second bearing journal 85, third bearing journal 87, fourth bearing journal 89, and fifth bearing journal 91 longitudinally spaced apart from one another along the rotational axis A. The first bearing journal 83 may be located adjacent the first crankshaft end 84, while the fifth bearing journal 91 may be located adjacent the second crankshaft end 86. The second bearing journal 85 may be located axially between the first bearing journal 83 and the third bearing journal 87. The third bearing journal 87 may be located axially between the second bearing journal 85 and the fourth bearing journal 89. The fourth bearing journal 89 may be located axially between the third bearing journal 87 and the fifth bearing journal 91.

Figure 4:
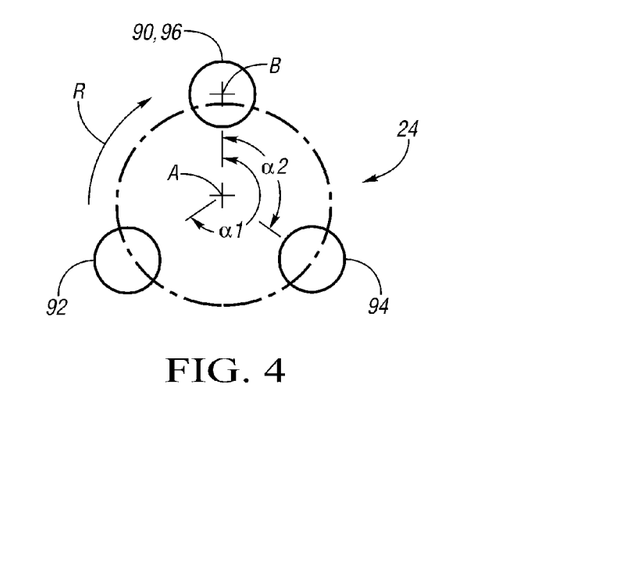
FIG. 4 is a schematic front illustration of the crankpin arrangement of the crankshaft of FIG. 3.

With reference to FIG. 4, some of the first, second, third, and fourth crankpins 90, 92, 94, 96 may be rotationally offset from one another. In the depicted embodiment, the first crankpin 90 and the fourth crankpin 96 may not be rotationally offset from each other. That is, the first crankpin 90 and the fourth crankpin 96 may be substantially aligned with each other along the pin axis B. However, it is envisioned that any two of the crankpins 90, 92, 94, 96 may be substantially aligned with each other along the pin axis B. Alternatively, the first crankpin 90 and the fourth crank pin 96 may be only slightly rotationally offset from each other. For example, the fourth crankpin 96 may be rotationally offset from the first crankpin 90 by about 2 to 5 degrees.

The second crankpin 92 may be rotationally offset from the first crankpin 90 and the fourth crankpin 96 in the rotational direction indicated by arrow R by a first angle α1 that ranges between about 235 degrees and about 245 degrees in the rotational direction of the crankshaft 24, which is indicated by arrow R. In other words, the second crankpin 92 may be rotationally offset from the pin axis B in the rotational direction indicated by arrow R by the first angle α1. The first angle α1 may be about 240 degrees. The third crankpin 94 may be rotationally offset from the first crankpin 90 and the fourth crankpin 96 in the rotational direction indicated by arrow R by a second angle α2 that ranges between about 115 degrees and about 125 degrees in the rotational direction indicated by arrow R. In other words, the third crankpin 94 may be rotationally offset from the pin axis B in the rotational direction indicated by arrow R by the second angle α2. For example, the second angle α1 may be about 120 degrees. Although FIG. 4 depicts a specific crankpin arrangement, it is contemplated that the crankshaft 24 may include any two crankpins 90, 92, 94, 96 substantially aligned with each other along the pin axis B, any other crankpin rotationally offset from the two substantially aligned crankpins by about 120 degrees in the rotational direction indicated by arrow R, and a further crankpin rotationally offset from the two substantially aligned crankpins by about 240 degrees in the rotational direction indicated by arrow R. In the embodiment depicted in FIG. 1, the first crankpin 90 and the fourth crankpin 96 may be referred to as the first group of crankpins, and the second crankpin 92 and the third crankpin 94 may be referred to as the second group of crankpins.

The crankpin arrangement of the crankshaft 24 allows the engine 12 to have an even firing order regardless of whether combustion occurs in all four cylinders 20A, 20B, 20C, and 20D every 720 degrees of crankshaft rotation or whether the fourth cylinder 20D is deactivated and combustion occurs only in the first cylinder 20A, second cylinder 20B, and third cylinder 20C every 720 degrees of crankshaft rotation. When one of the cylinders, such as the fourth cylinder 20D, is deactivated, the engine 12 operates in a three cylinder mode as described above. When combustion occurs in all cylinders 20A, 20B, 20C, 20D every 720 degrees of crankshaft rotation, the engine 12 operates in a four cylinder mode.

When the fourth cylinder 20D is deactivated, the firing order may be 1-3-x-2, wherein the number 1 represents combustion in the first cylinder 20A, the number 3 represents combustion in the third cylinder 20C, the number 2 represents combustion in the second cylinder 20B, and the letter "x" denotes that no combustion is occurring in the fourth cylinder 20D (i.e., a no combustion event). In other words, when the fourth cylinder 20D is deactivated, the firing order may include firing the first cylinder 20A, then firing the third cylinder 20C and then firing the second cylinder 20B. The engine assembly 10 defines a first firing interval when the intake valve lift mechanism 56 that is operatively coupled to the fourth intake valve 30D is in the inactive mode. This first firing interval may include a combustion event every 240 degrees of crankshaft rotation.

It is desirable to operate the engine 12 in the three cylinder mode during low loads, because such mode of operation reduces fuel consumption, noise, vibration, and harshness and improves the exhaust system efficiency. Additionally, a four cylinder engine capable of deactivating only one cylinder, such as the engine 12, is less costly than a four cylinder engine capable of deactivating two cylinders.

When the intake valve lift mechanism 56 that is operatively coupled to the fourth intake valve 30D is in the active mode, combustion occurs in all cylinders 20A, 20B, 20C, 20D every 720 degrees of crankshaft rotation, and the firing order of the engine 12 may be 1-3-4-2, wherein the number 1 denotes combustion in the first cylinder 20A, the number 3 represents combustion in the third cylinder 20C, the number 4 represents combustion in the fourth cylinder 20D, and the number 2 represents combustion in the second cylinder 20B. In other words, when the intake valve lift mechanism 56 that is operatively coupled to the fourth intake valve 30D is in the active mode, the firing order may include firing the first cylinder 20A, then firing the third cylinder 20C, then firing the fourth cylinder 20D, and then firing the second cylinder 20B. As discussed above, combustion occurs first in the first cylinder 20A. Then, combustion occurs in the third cylinder 20B at 240 degrees of crankshaft rotation. Next, combustion occurs in the fourth cylinder 20D at 360 degrees of crankshaft rotation. Subsequently, combustion occurs in the second cylinder 20B at 480 degrees of crankshaft rotation.

As described above, the first crankpin 90 and the fourth crankpin 96 may not be rotationally offset from each other. It is contemplated, however, that any two crankpins of the crankshaft 24 may not be rotationally offset from each other. In other words, two crankpins of the crankshaft 24 may be substantially aligned with each other along the pin axis B, while another crankpin 90 is rotationally offset from the pin axis B by about 120 degrees in the rotational direction indicated by arrow R, and yet another crankpin is rotationally offset from the pin axis B by about 240 degrees in the rotational direction indicated by arrow R.

Figure 5:
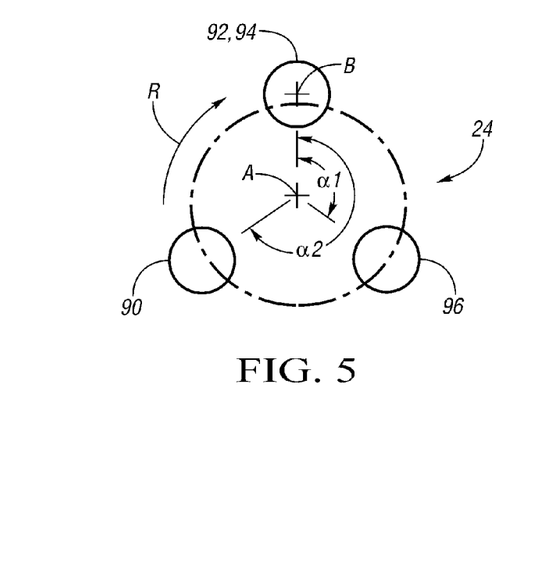
FIG. 5 is a schematic front illustration of an alternative crankpin arrangement of a crankshaft in accordance to another embodiment of the present disclosure.

With reference to FIG. 5, in an alternate embodiment, the second crankpin 92 and the third crankpin 94 may be not be rotationally offset from each other. In other words, the second crankpin 92 and the third crankpin 94 may be substantially aligned along the pin axis B. In this embodiment, the first crankpin 90 is rotationally offset from the second crankpin 92 and third crankpin 94 by about 240 degrees in the rotational direction indicated by arrow R. In other words, the first crankpin 90 is rotationally offset from the pin axis B by about 240 degrees in the rotational direction indicated by arrow R. The fourth crankpin 96 is rotationally offset from the second crankpin 92 and third crankpin 94 by about 120 degrees in the rotational direction indicated by arrow R. In other words, the fourth crankpin 96 is rotationally offset from the pin axis B by 120 degrees in the rotational direction indicated by arrow R. In the embodiment depicted in FIG. 5, the second crankpin 92 and the third crankpin 94 may be referred to as the first group of crankpins, and the first crankpin 90 and the fourth crankpin 96 may be referred to as the second group of crankpins.

Figures 6, 7, 8:
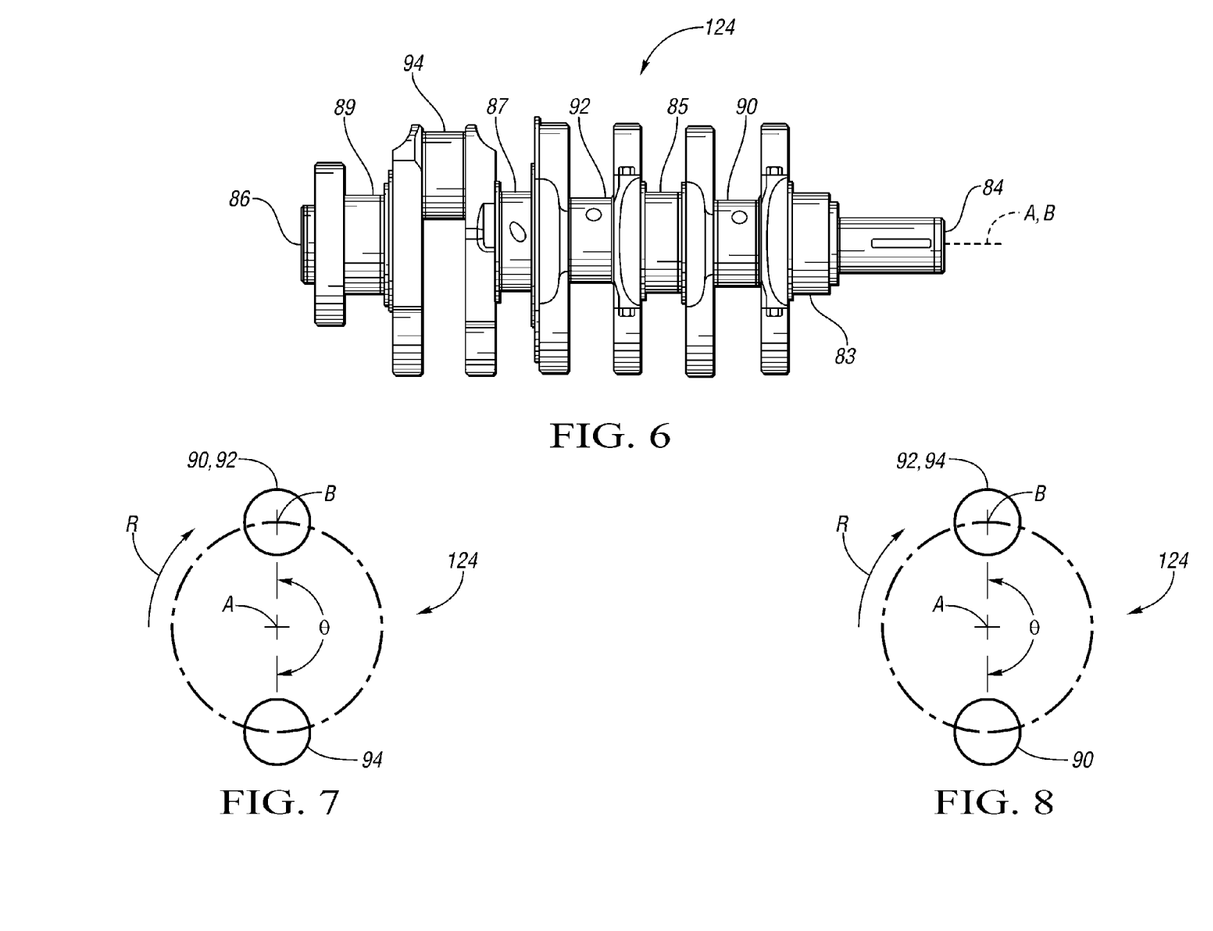
FIG. 6 is a schematic side view of a crankshaft in accordance with an alternative embodiment of the present disclosure.
FIG. 7 is a schematic front illustration of the crankpin orientation of the crankshaft of FIG. 6.
FIG. 8 is a schematic front illustration of the crankpin arrangement of another crankshaft in accordance with an embodiment of the present disclosure.

With reference to FIG. 6, in an alternate embodiment, a crankshaft 124 is configured to be part of a three cylinder engine and therefore includes three crankpins 90, 92, 94 instead of four crankpins. The crankshaft 124 is similar to the crankshaft 24; however, in the crankshaft 124, two crankpins 90, 92 are not rotationally offset from each other, while another crankpin 94 is rotationally offset from the other two crankpins 90, 92. In particular, the crankshaft 124 can rotate about a rotational axis A and includes the first crankshaft pin 90, second crankpin 92, and third crankpin 94 each located radially outward from the rotational axis A. The first crankpin 90 may be located adjacent the first crankshaft end 84, whereas the third crankpin 94 may be located adjacent the second crankshaft end 86. The second crankpin 92 may be located axially between the first crankpin 90 and the third crankpin 94. The second crankpin 92 may be substantially aligned with the first crankpin 90 along a pin axis B. The pin axis B may be substantially parallel to the rotational axis A.

The crankshaft 124 includes four bearing journals 83, 85, 87, and 89 longitudinally spaced apart from one another along the rotational axis A. The first bearing journal 83 may be located adjacent the first crankshaft end 84, while the fourth bearing journal 89 may be located adjacent the second crankshaft end 86. The second bearing journal 85 may be located axially between the first bearing journal 83 and the third bearing journal 87. The third bearing journal 87 may be located axially between the second bearing journal 85 and the fourth bearing journal 89.

With reference to FIG. 7, in the depicted embodiment, the first crankpin 90 and the second crankpin 92 may not be rotationally offset from each other. Accordingly, the first crankpin 90 and the second crankpin 92 are substantially aligned along the pin axis B. However, it is contemplated that any two of three crankpins 90, 92, 94 may be substantially aligned with each other along the pin axis B. Alternatively, the first crankpin 90 and the second crankpin 92 may be only slightly rotationally offset from each other. For example, the second crankpin 92 may be rotationally offset from the first crankpin 90 by about 2 to 5 degrees.

The third crankpin 94 may be rotationally offset from the first crankpin 90 and second crankpin 92 by a crankpin angle θ that ranges between about 175 and about 185 degrees in the rotational direction of the crankshaft 124, which is indicated by arrow R. In other words, the third crankpin 94 may be rotationally offset from the pin axis in the rotational direction indicated by arrow R by the crankpin angle θ. The crankpin angle θ may be about 180 degrees. Though FIG. 7 depicts a specific crankpin arrangement, it is envisioned that the crankshaft 124 may include any two of the three crankpins 90, 92, 94 substantially aligned with each other along the pin axis B, and another crankpin rotationally offset from the two substantially aligned crankpins by about 180 degrees in the rotational direction indicated by arrow R. In the embodiment depicted in FIG. 7, the first crankpin 90 and the second crankpin 92 may be referred to as the first group of crankpin, and the third crankpin 94 may be referred to as the remaining crankpin As discussed above, the crankshaft 124 is designed for a three cylinder engine. Thus, the engine 12 (FIG. 1) may only have three cylinders instead of four cylinders. The crankpin arrangement of the crankshaft 124 allows the engine 12 to have an even firing order regardless of whether combustion occurs in all three cylinders or one cylinder is deactivated. When one of the cylinders is deactivated, the engine 12 operates in a two cylinder mode. When combustion occurs in all three cylinders during one engine operating cycle, the engine 12 operates in three cylinder mode. It is desirable to operate the engine 12 in the two cylinder mode during low loads, because such mode of operation reduces fuel consumption, noise, vibration, and harshness and improves the exhaust system efficiency.

With reference to FIG. 8, in an alternate embodiment, the second crankpin 92 and third crankpin 94 may not be rotationally offset from each other. In other words, the second crankpin 92 and third crankpin 94 may be substantially aligned along the pin axis B. In this embodiment, the first crankpin 90 is rotationally offset from the second crankpin 92 and third crankpin 94 by about 180 degrees in the rotational direction indicated by arrow R. Thus, in this embodiment, the crankpin angle θ is about 180 degrees. In other words, the first crankpin 90 is rotationally offset from the pin axis B by about 180 degrees in the rotational direction indicated by arrow R. In the embodiment in FIG. 8, the second crankpin 92 and third crankpin 94 may be referred to as the first group of crankpins, and the first crankpin 90 may be referred to as the remaining crankpin.

The present disclosure also relates to methods of manufacturing a crankshaft. Any of the crankshafts disclosed in the present disclosure may be made by forging, casting, CNC machining or any other suitable manufacturing process. In an embodiment, the crankshaft may be made by forging a metallic structure. Forging is a manufacturing process involving the shaping of metal using localized compressive forces. Specifically, the manufacturing method may include forging a metallic structure to form a crankshaft having first, second, third, and fourth interconnected crankpins axially spaced apart from one another along a rotational axis. The first and fourth crankpins of the crankshaft made using the disclosed method are substantially aligned with each other along a pin axis. In addition, the second and third crankpins are rotationally offset from each other and from the pin axis in a rotational direction. The second crankpin of the crankshaft formed using the disclosed method may be rotationally offset from the first crankpin and fourth crankpin by about 240 degrees in the rotational direction.

The embodiments shown in the drawings or the characteristics of various embodiments mentioned in the present description are not necessarily to be understood as embodiments independent of each other. Rather, each of the characteristics described in one of the examples of an embodiment may be combined with one or a plurality of other desired characteristics from other embodiments, resulting in other embodiments not described in words or by reference to the drawings, which embodiments fall within the framework of the scope of protection requested in the present claims.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A crankshaft comprising:
a plurality of crankpins longitudinally spaced apart from each other along a rotational axis, each of the crankpins being configured to be operatively connected to a respective piston of an engine including a plurality of cylinders, the engine being configured to deactivate one of the cylinders;
wherein one of the crankpins extends along a pin axis;
wherein at least two of the crankpins are aligned with each other along the pin axis;
wherein another one of the crankpins is rotationally offset from the pin axis in a rotational direction of the crankshaft such that the engine has an even firing order even when only one of the cylinders is deactivated; and
wherein the plurality of crankpins includes a first crankpin, a second crankpin, a third crankpin, and a fourth crankpin, the second and third crankpins are aligned with each other along the pin axis, the second and third crankpins are not rotationally offset from each other, and the first crankpin is rotationally offset from the pin axis by 240 degrees in the rotational direction.

2. The crankshaft of claim 1, wherein the fourth crankpin is rotationally offset from the pin axis by 120 degrees.

3. The crankshaft of claim 2, wherein the pin axis is parallel to the rotational axis.

4. An engine assembly comprising:
an engine block defining a first cylinder, a second cylinder, a third cylinder, and a fourth cylinder arranged along a cylinder bank in an inline cylinder arrangement;
a plurality of pistons, each piston disposed in one of the first, second, third, and fourth cylinders;
a crankshaft operatively coupled to the plurality of pistons such that the crankshaft is configured to rotate about a rotational axis in a rotational direction as the pistons reciprocate within the first, second, third, and fourth cylinders, the crankshaft including a first crankpin, a second crankpin, a third crankpin, and a fourth crankpin longitudinally spaced apart from one another along the rotational axis, wherein the first crankpin extends along a pin axis;
an intake valve operatively coupled with the fourth cylinder, wherein the intake valve is movable between an open position to allow air/fuel mixture to enter the fourth cylinder and a closed position to preclude the air/fuel mixture from entering the fourth cylinder;
a control module configured to maintain the intake valve in a closed position so as to deactivate the fourth cylinder until the engine assembly is operated at a predetermined torque threshold;
wherein the first crankpin and the fourth crankpin are aligned with each other along the pin axis;
wherein the second and third crankpins are both rotationally offset from the first crankpin in the rotational direction such that the engine assembly has an even firing order even when only the fourth cylinder is deactivated; and
wherein the second crankpin is rotationally offset from the first crankpin by 240 degrees in the rotational direction.

5. The engine assembly of claim 4, wherein the third crankpin is rotationally offset form the first crankpin by 120 degrees in the rotational direction.

6. A method of manufacturing a crankshaft, comprising:
forging a metallic structure to form a crankshaft having first, second, third, and fourth interconnected crankpins axially spaced apart from one another along a rotational axis, the first crankpin extending along a pin axis, the first and fourth crankpins are aligned with each other along the pin axis, and the second and third crankpins are rotationally offset from each other and from the pin axis in a rotational direction, wherein forging the metallic structure includes forging the metallic structure to form the crankshaft having the second crankpin rotationally offset from the first crankpin and fourth crankpin by 240 degrees in the rotational direction.

* * * * *